D. J. BLOCHER.
NUT LOCK.
APPLICATION FILED OCT. 18, 1913.

1,134,666.

Patented Apr. 6, 1915.

Witnesses
Inventor
Daniel J. Blocher,
By
his Attorney

UNITED STATES PATENT OFFICE.

DANIEL J. BLOCHER, OF PEARL CITY, ILLINOIS.

NUT-LOCK.

1,134,666.

Specification of Letters Patent.

Patented Apr. 6, 1915.

Application filed October 18, 1913. Serial No. 796,016.

*To all whom it may concern:*

Be it known that I, DANIEL BLOCHER, a citizen of the United States, residing at Pearl City, in the county of Stephenson and State of Illinois, have invented certain new and useful Improvements in Nut-Locks, of which the following is a specification.

This invention relates to nut locks and has for its primary object to arrange suitable means with the nut for locking the same on a bolt, the means being carried within the nut so as to give the same the appearance of the ordinary type of nut now in use.

Another object of this invention is to provide a nut which may be associated with the usual type of bolt, and one which is simple of construction, durable and inexpensive to manufacture.

Other objects as well as the nature, characteristic features and scope of my invention will be more readily understood from the following description taken in connection with the accompanying drawings and pointed out in the claims forming a part of this specification.

Figure 1:
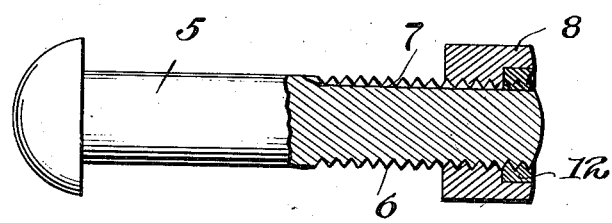
Figure 2:
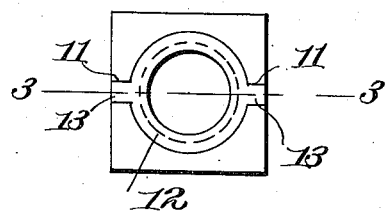

Referring to the drawings:—Figure 1 is a side elevation of a bolt, a part thereof being shown in longitudinal section illustrating the application of my improved nut, the nut being shown in cross section; Fig. 2 is a front elevation of my improved nut; and Fig. 3 is a sectional view taken on the line 3—3 of Fig. 2.

In the drawings wherein is illustrated the preferred embodiment of this invention a bolt 5 is provided which may be of the ordinary or any desired form being provided with an externally screw-threaded shank 6 having formed therein a longitudinal groove 7.

Figure 3:
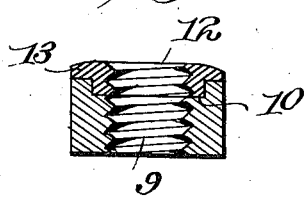

Mounted for movement on the threaded shank 6 of the bolt 5 is my improved nut 8 which is provided with an internally threaded bore 9, a portion of said bore being cut-out as indicated at 10 and shown to advantage in Fig. 3. At diametrically opposite points on the outer face of the nut, are cut-out portions 11 the function of which will presently appear. Mounted in the cut-out portion 10 of the nut 8 is an inelastic washer 12 which is preferably made of lead or an analogous soft metal, the washer having extending from the outer periphery thereof a pair of fingers or lugs 13 which are adapted to snugly engage in the cut-out portions 11 which are formed in the outer face of the nut. Upon reference to Fig. 3 of the drawings it will be seen that the washer 12 extends downwardly into the cut-out portion of the bore 10 and the fingers 13 thereof are so formed as to lie flush with the outer or front face of the nut, thereby in no way detracting from its appearance.

In operation the inelastic washer 12 is seated in the cut-out portion 10 of the nut and the nut threaded on the screw-threads 6 of the bolt in the ordinary manner and to the desired point. As soon as the desired point has been reached and it is desired to lock the nut on the bolt, a suitable instrument is used for exerting pressure on the inelastic washer, which as previously pointed out is preferably formed of a soft metal, so as to cause the metal to be forced into the threads thereby preventing the accidental reverse rotation of the nut on the bolt, although, it is evident the nut may be reversely turned on the bolt through the medium of a wrench or similar tool, the inelastic washer merely preventing the reverse rotation of the nut on the bolt, caused by vibration or the like. Where a more positive locking means is desired, the longitudinal groove 7 has been formed in the bolt in which the metal will be forced when pressure is exerted on the washer 12. This form only being used in exceptional cases.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A nut lock including a bolt having a threaded shank and provided with a longitudinally extending groove, a nut threaded on the bolt and provided with an annular depression in its outer face, and a soft washer mounted in said depressed portion having lugs formed thereon for engagement with complemental grooves in said nut for holding the washer in a fixed position, said washer adapted to be forced into the threads and groove of said bolt to prevent accidental displacement of the nut.

2. A nut lock, in combination with a bolt provided with a longitudinal groove, a nut having a portion of its outer face cut-out and a pair of cut-out portions formed at diametrically opposite points on the outer face of said nut communicating with the first mentioned cut-out portion, an inelastic washer arranged in said first mentioned cut-out portion, and a plurality of fingers extending from the outer periphery of said washer and lying in said cut-out portions in the forward face of said nut for the purpose set forth.

In testimony whereof I affix my signature in presence of two witnesses.

DANIEL J. BLOCHER.

Witnesses:
ORIE W. Dow,
C. B. BARKLOW.